United States Patent
Agarwal et al.

(10) Patent No.: US 9,542,395 B2
(45) Date of Patent: Jan. 10, 2017

(54) SYSTEMS AND METHODS FOR DETERMINING ALTERNATIVE NAMES

(71) Applicant: United Video Properties, Inc., Santa Clara, CA (US)

(72) Inventors: Vineet Agarwal, Andover, MA (US); Sashikumar Venkataraman, Andover, MA (US)

(73) Assignee: Rovi Guides, Inc., San Carlos, CA (US)

(*) Notice: Subject to any disclaimer, the term of this patent is extended or adjusted under 35 U.S.C. 154(b) by 287 days.

(21) Appl. No.: 14/473,609

(22) Filed: Aug. 29, 2014

(65) Prior Publication Data
US 2016/0062994 A1   Mar. 3, 2016

(51) Int. Cl.
| | | |
|---|---|---|
| *G06F 17/30* | (2006.01) | |
| *H04N 21/482* | (2011.01) | |
| *H04N 21/232* | (2011.01) | |
| *G06F 17/27* | (2006.01) | |
| *G06F 17/22* | (2006.01) | |

(52) U.S. Cl.
CPC ....... *G06F 17/30038* (2013.01); *G06F 17/278* (2013.01); *G06F 17/3053* (2013.01); *G06F 17/30643* (2013.01); *G06F 17/30867* (2013.01); *H04N 21/232* (2013.01); *H04N 21/4828* (2013.01); *G06F 17/2235* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2010/0153885 A1 | 6/2010 | Yates |
| 2010/0312778 A1* | 12/2010 | Lu .................. G06F 17/3064 707/759 |

* cited by examiner

*Primary Examiner* — Hung Q Pham
(74) *Attorney, Agent, or Firm* — Ropes & Gray LLP

(57) ABSTRACT

Systems and methods described herein provide for determining alternative names for a target name. A plurality of candidate alternative names is retrieved. For example, if the target name is "bush", the candidate alternative names may include "George W. Bush", "George H. W. Bush", "Jeb Bush", "Bush, Illinois (location)", and "Bush (plant)". A plurality of information sources associated with the target name are identified (e.g., documents, media assets or other information associated with "bush"). A first value and a second value are computed for a first candidate name (e.g., "George W. Bush") and second candidate name ("George H. W. Bush"), respectively, based on how many of the identified information sources refer to the first and second candidate names, respectively. In response to determining that the first value exceeds the second value, the first candidate name, instead of the second candidate name, is assigned as an alternative name for the target name.

20 Claims, 5 Drawing Sheets

SYSTEMS AND METHODS FOR DETERMINING ALTERNATIVE NAMES

BACKGROUND

Objects are often referenced by multiple alternative names. For example, a person may be referred to by birth name, last name, first name, nick name, celebrity name, pen name, etc. Additionally, the same name may be associated with multiple different objects. For example, the name "bush" may refer to the person "George W. Bush", the "bush" plant, the city "Bush, Illinois", the product "Bush" beer, etc. As such, the lack of one-to-one correspondence between name and object makes object identification more difficult, adding a layer of complexity to searching and classification schemes. Some conventional systems address this identification problem by relying on the user to choose the best match from a list of potential alternative names. However, due to their reliance on user input, such systems lack intelligence to automate the selection of the strongest alternative name.

SUMMARY

Accordingly, systems and methods are described herein for automatically determining the likely alternative names for a target name by computing scores for each candidate alternative name and selecting candidate names with higher scores as likely alternative names. The score may be based on many factors, including how many information sources associated with the target name (e.g., "bush") refer to a candidate name (e.g., the president "George W. Bush"). Thus, the computed score is intended to reflect the likelihood that a target name refers to a given candidate name. By computing these scores, the systems and methods described herein provide intelligence on which alternative name is more likely to be associated with a target name, enhancing the automation of alternative name determination.

For example, a video hosting application may classify videos based on subject matter so that videos may be more easily searched. In one instance, a video about the president "George W. Bush" may be uploaded with the following description: "President Bush addresses the nation about the 9/11 attacks on the World Trade Center". The video hosting cross-references terms in the video description with a database of category names and determines that the term "Bush" (i.e., target name) is associated with multiple categories with the same name (i.e., candidate alternative names). For example, these categories may include the "bush" plant, the former president "George W. Bush", the other former president "George H. W. Bush", the former governor "Jeb Bush", the location "Bush, Illinois", and the beer product "Bush". To narrow down the choices, the video application may retrieve a list of information sources associated with the target name "Bush". The application may then process each of these information sources to determine how many of them refer to each of the candidate alternative names. For example, the video application may determine that the candidate name "George W. Bush" was referred to by the highest proportion of information sources (e.g., one-third of all information sources (e.g., one-fourth to "George H. W. Bush", one-fourth to the "bush" plant, etc.). The video application may compute a score for each of the candidate alternative names based on these proportions, as well as other factors that reflect the degree of association between the candidate name and the target name (e.g., "bush"). Once these scores are computed, the video application may determine that the candidate name "George W. Bush" has the highest score and assign the candidate name "George W. Bush" as the most likely alternative name for the target name "bush". Based on this assignment, the application may classify the uploaded video about "bush" under the "George W. Bush" category.

In some aspects, the systems and methods described herein retrieve a plurality of candidate alternative names for a target name. For example, a content managing application may wish to classify subject matter associated with a target name (e.g., "bush"). The target name may be a name that is associated with any object, such as a video, a media asset, a book, an article, a person, etc. The application may retrieve a list of alternative names as potential classifiers for the subject matter. For example, the list of alternative names may include: the former president "George W. Bush", the other former president "George H. W. Bush", the former governor "Jeb Bush", the "bush" plant, and the beer product "Bush", the location "Bush, Illinois", etc. Once retrieved, the plurality of candidate alternative names may be stored. For example, the list of alternative names may be stored locally to the content application.

In some aspects, the systems and methods described herein identify a plurality of information sources associated with the target name (e.g., "bush"). For example, a content application may retrieve a list of the information sources from a remote database. These information sources may be documents, media assets, or other objects that are associated with the target name. For example, an information source may be a document with the term "bush" in its title or in the body of the document. In another example, an information source may be a media asset that has the term "bush" in its title or in a metadata file associated with the media asset. In yet another example, an information source may be a user profile associated with a name that includes the term "bush".

In some aspects, the systems and methods described herein compute a first value based on how many of the information sources refer to a first candidate name and a second value based on how many of the information sources refers to a second candidate name. The first and second candidate names are included in the plurality of candidate alternative names. For example, the first candidate name may be "George W. Bush" (the former president), and the second candidate name may be "George H. W. Bush" (the other former president). For example, a content application may determine that 10,000 of the identified information sources associated with the target name (e.g., "bush") refer to the first candidate name (e.g., "George W. Bush" (the former president)), whereas 8,000 of the identified information sources refer to the second candidate name (e.g., "George H. W. Bush" (the other former president)). An information source may "refer" to a name by mentioning the name in text and/or linking the name to another information source.

Based on these numbers, the content application may compute a first value for the first candidate name and a second value for the second candidate name. These values provide an indication of the likelihood that a target name (e.g., "bush") is actually referring to a particular candidate name. In some instances, this likelihood may be approximated by the number of information sources, associated with the target name, that refer to a candidate name. For example, the first value may be higher than the second value because more information sources refer to the first candidate name than the second candidate name.

In some aspects, the systems and methods described herein assign the first candidate name, instead of the second candidate name, as an alternative name for the target name in response to determining that the first value exceeds the second value. For example, if the content application determines that the first score is greater than the second score, the content application assigns the first candidate name "George W. Bush", and not the second candidate name "George H. W. Bush" as an alternative name of the target name "bush". This alternative name assignment may be used to classify an object associated with the target name. For example, a video that is tagged with the target name "bush" may be classified under the "George W. Bush" category as a result of the alternative name assignment.

In some embodiments, the first value is a first proportion of the identified plurality of information sources that refer to the first candidate, and the second value is a second proportion of the identified plurality of information sources that refers to the second candidate name. For example, one-third of all identified information sources associated with the target name (e.g., bush) refer to "George W. Bush", and one-fourth of all the identified information sources refer to "George H. W. Bush". These proportion values may then be used to compute the first and second values of the first and second candidate names, respectively.

In some embodiments, the first value is computed based on a first metadata associated with the first candidate name, and the second value is computed based on a second metadata associated with the second candidate name. These first and second metadata are retrieved from at least one of the plurality of information sources. For example, a first information source of the identified plurality of information sources associated with the target name (e.g., "bush") refers to the first candidate name (e.g., "George W. Bush"). This first information source may contain metadata that provides further information about the first candidate name in relation to the information source. For example, the first information source may be a web document, and the first metadata may be embedded in a metadata tag in a JavaScript file. The second information source refers to the second candidate name (e.g., "George H. W. Bush"). The second information source may be the same type of source (e.g., web document) as the first information source. In another example, the second information source may be a different type of source than the first information source. For example, the second information source may be a video file that provides information about the contents of a video. In this example, the video file may be labeled with the target name (e.g., "bush.mpg"). Like the first information source, this video file may also contain metadata tags that provide further information about the second candidate name (e.g., "George H. W. Bush").

In some embodiments, the first metadata may indicate the position of the first candidate name (e.g., "George W. Bush") in an information source from the identified plurality of information sources associated with the target name (e.g., "bush"). For example, the first metadata may indicate that the first candidate name (e.g., "George W. Bush") is located in the title, a particular paragraph, bibliography, or any other location in a document. Certain positions are associated with higher weights than other positions. For example, a title position is given a higher weight than a footnote or bibliography position, since the title tends to be a better indication of the subject matter of the document than the footnote or bibliography. Similarly, terms located at positions nearing the top of the document also tend to better reflect the subject matter of the document than at positions nearing the bottom of the document. The first metadata may also indicate whether the first candidate name is hyperlinked in the document. Each of these factors may be associated with a particular weight in computing the first value of the first candidate name. In some embodiments, the hyperlink is associated with a higher weight than the position in computing the first value for the first candidate name. For example, if the first metadata indicates that the first candidate name (e.g., "George W. Bush") is hyperlinked in the title (a position) the first information source (e.g., web document associated with the target name "bush"), the weight assigned to the hyperlink is higher than the weight assigned to the title position. A similar weighting scheme based on computing the second value for the second candidate name may also be used.

In some embodiments, each of the plurality of information sources may be one of many different types of information sources. Any of the information sources may be a webpage associated with the target name. For example, the webpage may be a wiki page with a title or subject matter that includes the target name "bush" in its title, content description, or metadata. Any of the information sources may be an article associated with the target name. For example, the article may be an online or offline article with the target name "bush" in its title content description, or metadata. Any of the information sources may be a book associated with the target name. For example, the book may include the target name "bush" in its title or content description. Any of the information sources may be a media asset associated with the target name. For example, the media asset may be a video, song, television show, movie, soundtrack, or any other media asset that includes the target name "bush" in its title, content description, or metadata.

In some embodiments, the systems and methods described herein retrieve, using control circuitry, a list of disambiguation documents associated with the target names. For example, the list of disambiguation documents may be a list of documents that have a same or very similar name as the target name, each of which represents different subject matter. For example, if the target name is "bush", the list of disambiguation documents may be a list of documents about "George W. Bush (former president)", "George H. W. Bush (former president)", "Jeb Bush (former governor)", "Bush (plant)", "Bush, Illinois (location)", "Bush (beer)", and any other documents that include the target name in the title. The plurality of candidate alternative names is then extracted from the retrieved list of disambiguation documents. For example, the plurality of candidate alternative names may be the entire list of disambiguation documents or a subset. The plurality of alternative names may be selectively extracted from the list of retrieved disambiguation documents based on contextual cues provided in a description of an object associated with the target name (e.g., description about a video about "bush").

In some embodiments, the target name is associated with a media asset. For example, the target name "bush" may be the name of a media asset file (e.g., "bush.mpg"). In another example, the target name "bush" may be included in a content description about a media asset (e.g., a video with the description "George W. Bush addresses the nation about the 9/11 attacks on the World Trade Center"). In yet another example, the target name may be a term that is included in a metadata tag in a document (e.g., <subject> "bush" </subject>). Each of the plurality of candidate alternative names may represent a different candidate category for the media asset. For example, it may not be clear which category a video named "bush.mpg" belongs. A video application may match the name "bush" with a list of categories for which to classify the video. Each of these categories may include the target name "bush". For example, these categories may include, but are not limited to, "George W. Bush", "George H. W. Bush", "Jeb Bush", the "bush" plant, the location "Bush, Illinois", etc. These categories may be used to classify the video so that the videos in a video application may be more easily searched by users.

In some embodiments, the systems and methods described herein filter, using control circuitry, the plurality of candidate alternative names, wherein the filtering comprises removing a candidate name from the plurality of candidate alternative names in response to determining that a target information source associated with the target name does not refer to the candidate name. For example, the target information source may be a file that describes an object associated with the target name. This file may be a document, an excerpt, metadata, etc. For example, the target information source for the video file "bush.mpg" may be a document that provides the description of the video content (e.g., "George W. Bush addresses the nation about the 9/11 attacks on the World Trade Center"). Control circuitry may execute a video application to determine whether the video description file refers to the candidate name or a variant of the candidate name. For example, the video description includes the first candidate name "George W. Bush" but not the candidates name "Jeb Bush" or the candidate name "Bush, Illinois". Thus, the video application may filter these candidates ("Jeb Bush" and "Bush, Illinois") and remove them from the plurality of alternative candidate names. Although the second candidate name "George H. W. Bush" is very similar to "George W. Bush", the video application may not remove the second candidate name from the plurality of alternative candidate names. After the alternative candidate names have been filtered, the remaining filtered candidates may include the names "George W. Bush", "George H. W. Bush", and the "bush" plant, since each of these candidate names, or a very similar variant thereof, are included in the target information source (e.g., a file describing the video named "bush.mpg").

In some embodiments, it may be difficult to choose which candidate name is a stronger alternative name for the target name based on the initially computed first and second values. For example, since the first candidate name "George W. Bush" and the second candidate name "George H. W. Bush" are very similar in spelling and both names refer to former presidents, it is possible that both candidate names may have similar first and second values. For example, 1000 information sources associated with the target name "bush" may refer to the first candidate name "George W. Bush", and 900 information sources associated with the target name "bush" may refer to the second candidate name "George H. W. Bush". Consequently, the first and second values, if computed based on these numbers alone, may be very close to each other. Since the difference between the first and second values may not be great enough to differentiate the two candidate names, further processing may be needed to better determine which of the candidate names is the stronger alternative name for the target name. This further processing may be used as a tiebreaker between two or more candidate names.

In some embodiments, to further distinguish one or more candidate alternative names, primary and secondary keywords may be identified from a plurality of keywords associated with a media asset. For example, the plurality of keywords may be extracted from a description about a video (e.g., "George W. Bush addresses the nation about the 9/11 attacks on the World Trade Center"). The primary keyword may be the target name (e.g., "bush"). The secondary keywords may include other words from the video description, such as, "president", "9/11", and "World Trade Center". In some embodiments, only one primary keyword is identified, and one or more secondary keywords are identified. Keywords may be identified by cross-referencing words in a description with a database of keywords associated with subject matter. Control circuitry may then compute a first correlation value between the first candidate name and each of the secondary keywords, as well as compute a second correlation value between the second candidate name and each of the secondary keywords. These correlation values provide a stronger indication of whether a candidate name is a strong alternative name for a target name by using contextual information (via secondary keywords) associated with the target name.

For example, since the secondary keywords (e.g., "president", "9/11", "World Trade Center") are more uniquely associated with the first candidate name "George W. Bush" than the second candidate name "George H. W. Bush", the first candidate name will have a higher correlation value than the second candidate name. Furthermore, the computation of correlation values may serve as a filtering step to remove other candidate alternative names. For example, the candidate names "Jeb Bush" and the "bush" plant may be filtered out because they are not strongly correlated with the secondary keywords ("president", "9/11", "World Trade Center"). Using the first and second correlation values, control circuitry may update the first and second values, previously computed for the first and second candidate names, respectively, with the computed first and second correlation values.

In some embodiments, the systems and methods described herein compute the correlation values based on the number of times a secondary keyword appears in an information source associated with its respective candidate name. For example, control circuitry may compute the first correlation value between the first candidate name (e.g., "George W. Bush") and a secondary keyword (e.g., "president") by counting the number of times the secondary keyword (e.g., "president") appears in an information source about the first candidate name (e.g., a wiki page about George W. Bush). Similarly, control circuitry may compute the second correlation value between the second candidate name (e.g., "George H. W. Bush") and the secondary keyword (e.g., "president") by counting the number of times the secondary keyword appears in an information source about the second candidate name (e.g., a wiki page about George H. W. Bush). Correlation values may be computed between a candidate name and each of a plurality of secondary keywords (e.g., "president", "9/11", "World Trade Center", etc.), and these correlation values may be aggregated to determine the aggregate correlation value for a given candidate name. For example, since both the first and second candidate names refer to individuals that served as presidents, they may have similar correlation values based on the first keyword "president". However, the second and third keywords (e.g., "9/11" and "World Trade Center") may be more uniquely associated with the first candidate name "George W. Bush" than the second candidate name "George H. W. Bush", since those secondary keywords refer to events that occurred during the presidency of "George W. Bush" and not "George H. W. Bush". Thus, the aggregate of the correlation value computed across all secondary keywords for the first candidate name may be higher than the aggregate correlation value computed across all secondary keywords for the second candidate name. Control circuitry then computes the first and second values of the first and second candidate names based on these aggregate correlation values. If the first value is higher than the second value, control circuitry may assign the first candidate name (e.g., "George W. Bush"), instead of the second candidate name (e.g., "George H. W. Bush") as an alternative name for the target name (e.g., "bush").

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
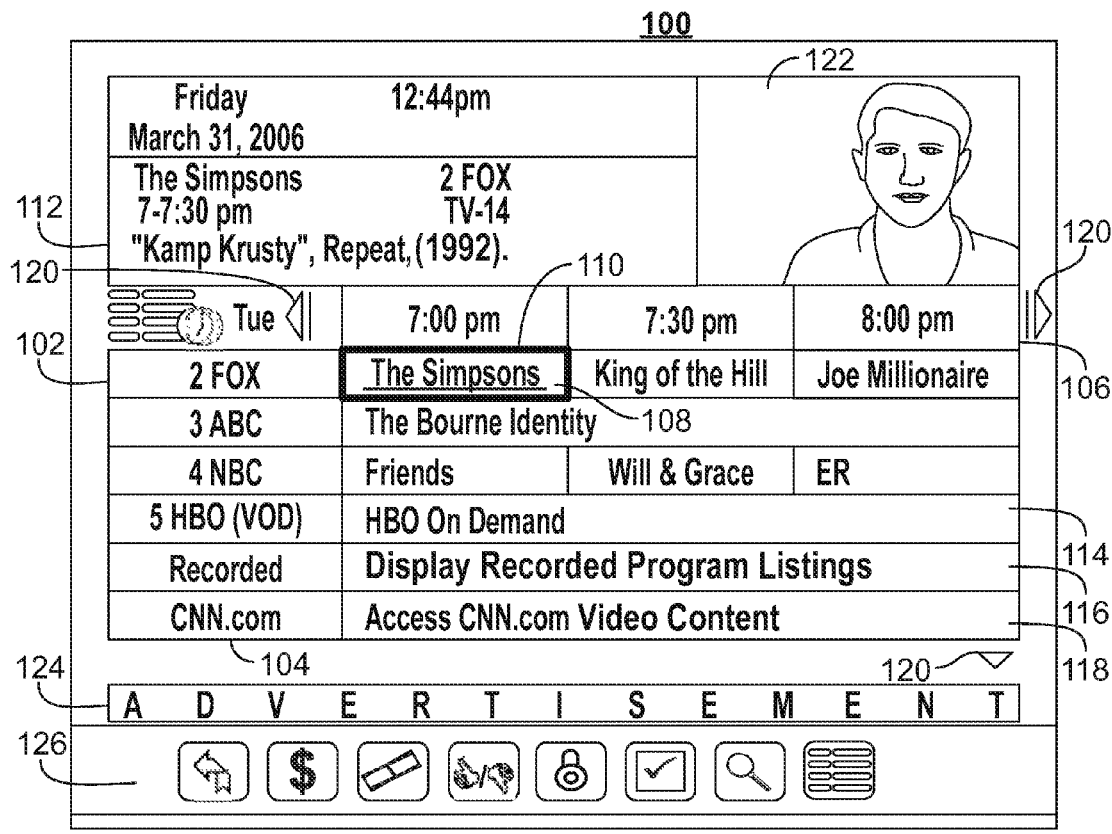
FIGS. 1 and 2 show illustrative display screens that may be used to provide media guidance application listings in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
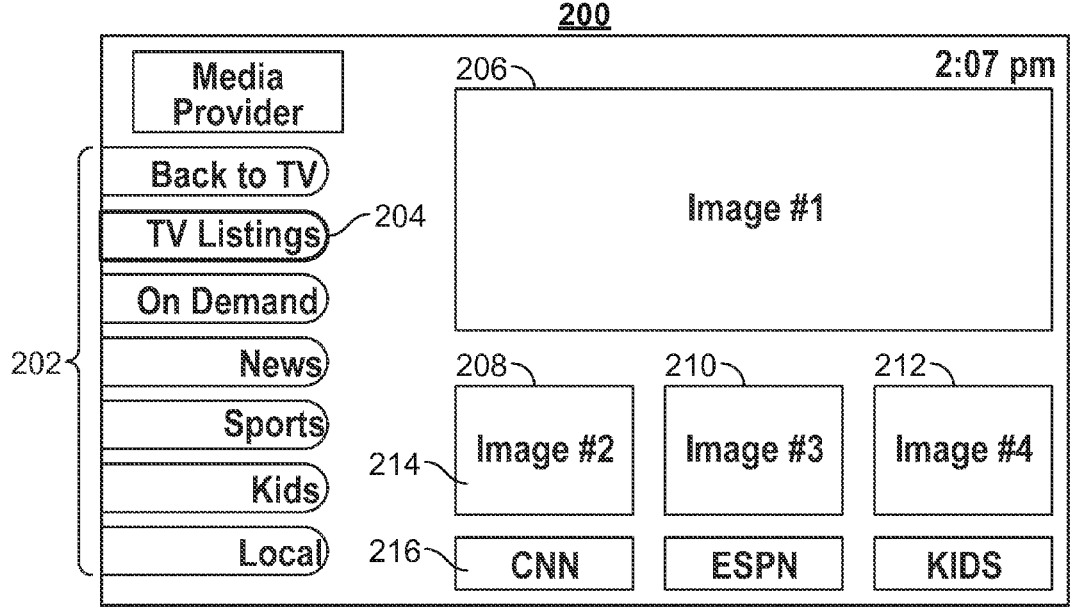

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
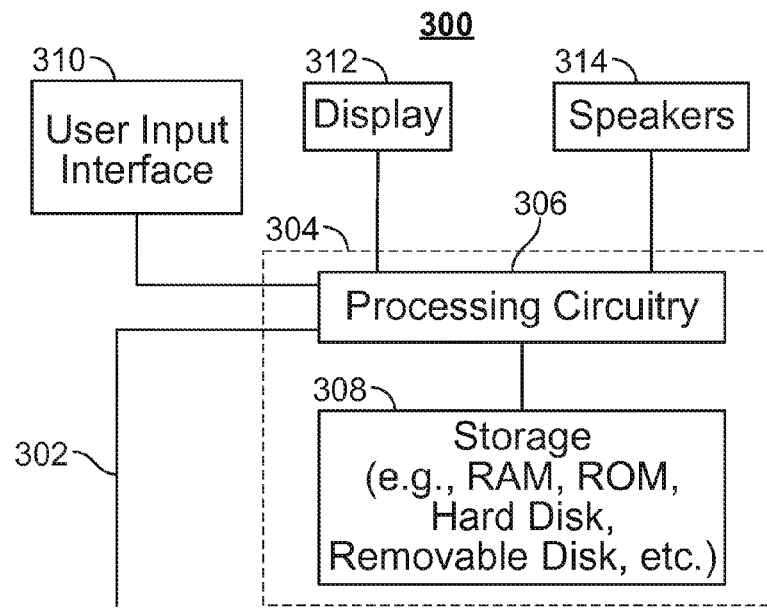
FIG. 3 shows an illustrative user equipment device in accordance with another embodiment of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server 415. For example, the remote server 415 may store the instructions for the application in a storage device. The remote server 415 may process the stored instructions using circuitry (e.g., control circuitry 304) and generate the displays discussed above and below. The client device may receive the displays generated by the remote server 415 and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server 415 for processing and generating the corresponding displays. For example, equipment device 300 may transmit a communication to the remote server 415 indicating that an up/down button was selected via input interface 310. The remote server 415 may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
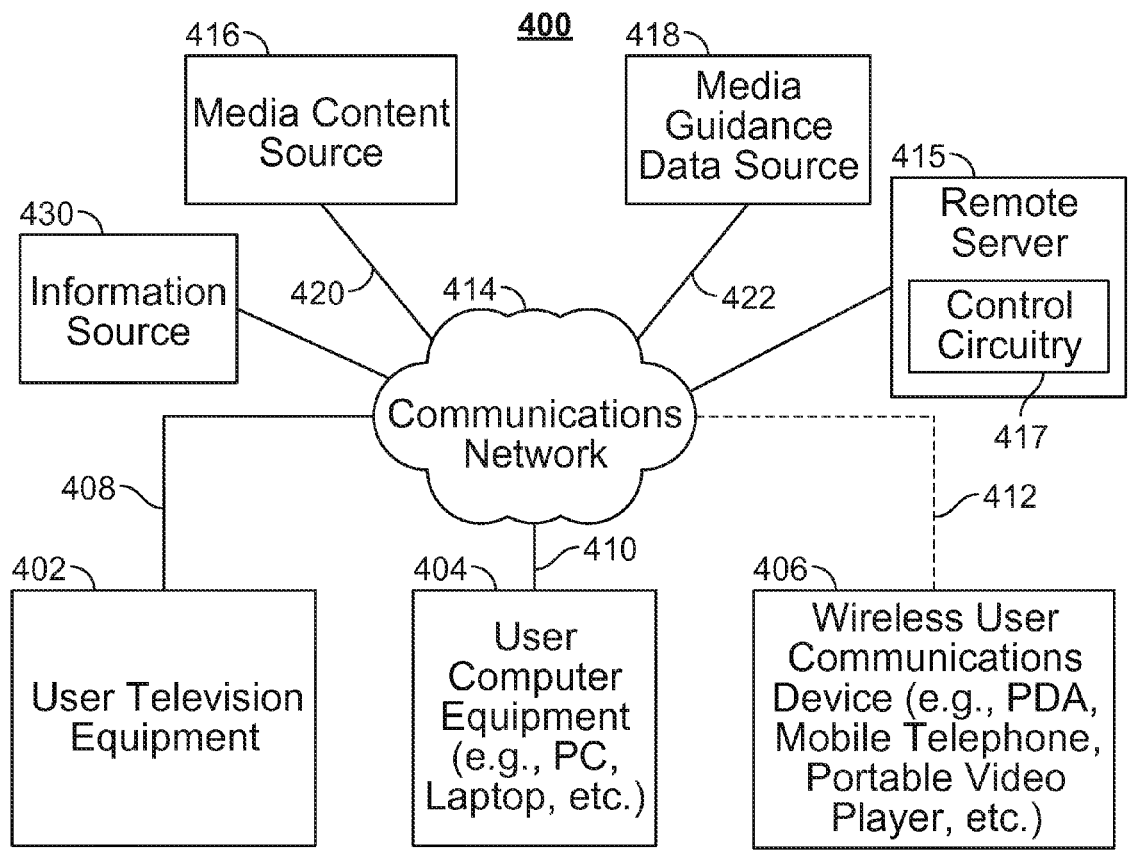
FIG. 4 is a diagram of an illustrative cross-platform interactive media system in accordance with another embodiment of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server 415. For example, media guidance applications may be implemented partially as a client application on control circuitry 304 of user equipment device 300 and partially on a remote server 415 as a server application (e.g., media guidance data source 418) running on control circuitry 417 of the remote server 415. When executed by control circuitry 417 of the remote server 415, the media guidance application may instruct the control circuitry 417 to generate the guidance application displays and transmit the generated displays to the user equipment devices. The server application may instruct the control circuitry 417 of the remote server 415 to transmit data for storage on the user equipment. The client application may instruct control circuitry 304 of the receiving user equipment to generate the guidance application displays.

In some embodiments, the server application executed by control circuitry 417 of remote server 415 may be a content management application that classifies content. This content may include, but is not limited to, media assets, articles, books, webpages, or any other online or offline content. For example, the server application may classify a particular object (e.g., document, media asset, article, book, etc.) under a particular category that reflects the content/subject matter of the object. The classification process may involve determining one or more likely alternative names for the target name of an object. As referred to herein, "target name" should be understood to mean a word that is used to refer to a particular object in question. For example, if an object is a video about "President George W. Bush", the target name may be "George W. Bush", whereas the alternative name is just "President Bush". A "target name" may be interchangeable with an "alternative name". As referred to herein, "alternate name" or "alternative name" should be understood to mean one of a plurality of words that are used to refer to the same object. For example, a person may be referred to by multiple different names, such as by birth name, first name, last name, middle name, nickname, celebrity name, pen name, etc. These names are all alternate names of each other. As referred to herein, an object may be any entity, such as a person, a physical object, a document, an information source, a media asset, a location, a product, a name, a label, a book, an article, etc.

The classification process may result in one or more candidate names being assigned as alternative names for the target name, such that the object associated with the target name is classified under the assigned alternative names. The architecture of this classification process is discussed in further detail in relation to FIG. 5 below. As referred to herein, "candidate names" or "candidate alternative names" should be understood to mean words that potentially refer to the same object. For example, if a person is named "Bush", candidate alternative names may be "George W. Bush", "George H. W. Bush", and "Jeb Bush". Each of these candidate alternative names refer to different individuals but potentially refer to the same individual that is referred to by "Bush". To decide which, if any, of these candidate alternative names refers to the same person as "Bush", further processing may be needed based on contextual cues.

As part of the classification process, remote server 415 may communicate with one or more other entities, such as information source 430. As referred to herein, "information source" should be understood to mean any source of information, such as content itself (e.g., document, media asset, article, book, online or offline content, etc.), information about content (e.g., a list of content), and a database that stores information. Information source 430 may comprise one or more databases that store one or more types of information sources. These databases may be located in a central repository or stored separate on individual remote servers. For example, the type of information sources may include, but are not limited to, web documents, articles, books, media assets, and any other online or offline content. Each of the databases that comprise information source 430 may be a collection of one type of information source or a combination of different types of information sources. Additionally, information source 430 may store a list of keywords that reflects the content stored in the information source databases. In some embodiments, each of these keywords may be associated with a list of candidate alternate names. For example, these candidate alternate names may be a list of disambiguation terms and/or objects. As referred to herein, "disambiguation" should be understood to be interchangeable with "alternate names" or "alternative names". For example, information source 430 may store a list of keywords, which includes the keyword "bush". Information source 430 may also store a list of disambiguation terms that are associated with this keyword (e.g., "George W. Bush", "George H. W. Bush", "Jeb Bush", the "bush" plant, the location "Bush, Illinois", the beer product "Bush", etc.). The list of disambiguation terms may also be associated with a corresponding list of disambiguation objects (e.g., documents, media assets, articles, etc., containing content about each of the terms in the disambiguation list).

Control circuitry 417 of remote server 415 may retrieve information sources from the databases of information source 430 over communications network 414 in the classification process. For example, control circuitry 417 may retrieve a list of candidate alternate names (e.g., disambiguation terms) from information source 430 for a particular target name (e.g., "bush") in order to classify an object associated with that target name (e.g., media asset with "bush" in its title) under a particular category. This list of candidate alternative names may be associated with corresponding objects that are also stored in one or more databases of information source 430. Once the list is retrieved, control circuitry 417 may perform an optional filtering process to remove weaker candidate names from the list of candidate alternate names. Control circuitry 417 may then move onto computing values for each of the candidate names in the list of candidate alternative names to determine one or more likely alternative names for the target name (e.g., "bush"). As referred to herein, the "value" that is computed for each candidate alternative name should be understood to mean any value that serves as an indicator of how "strong" or "likely" a given candidate name is an alternative name for a target name. For example, a first candidate name "George W. Bush" may have a higher computed value than a second candidate name "Jeb Bush", because it is more likely that a video called "bush.mpg" refers to "George W. Bush" than "Jeb Bush". The general process of determining alternative names is discussed in further detail in relation to FIG. 7.

In particular, these values may be computed by control circuitry 417 based on many factors. For example, one factor may be the number of information sources associated with a target name (e.g., "bush") that refer to a candidate name (e.g., "George W. Bush"). As referred to herein, the term "refer" (in the context of an information source referring to a name) should be understood to mean an information source including a name or associating a hyperlink with the name in the information source (e.g., selection of the hyperlinked name would navigate a user to another information source). Control circuitry 417 may also compute the values for each of the candidate alternative names based on other factors, such as a correlation value between a candidate name and one or more secondary keywords associated with the target name (e.g., "Bush"). Further details about the computation of these values based on multiple factors are discussed in relation to FIG. 8.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
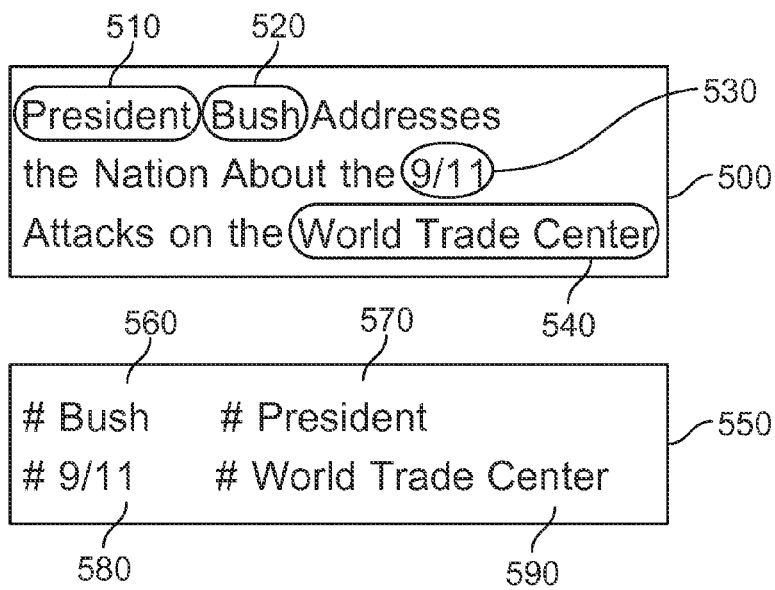
FIG. 5 shows illustrative descriptions of an object associated with a target name in accordance with some embodiments of the disclosure.

FIG. 5 shows illustrative descriptions of an object associated with a target name in accordance with some embodiments of the disclosure. Descriptions 500 and 550 are two different representations of descriptions that may be provided for an object associated with a target name. The target name may be "Bush". This target name may be extracted by control circuitry 417 of remote server 415 from a metadata file associated with the object or from the description (500, 550) itself. In some embodiments, the object may be a media asset. For example, the media asset may be a video whose video file is named "bush.mpg". In other embodiments, the object may be another type of content, such as a document, a book, an article, or any other type of content that is associated with the target name.

Control circuitry 417 may generate visual representations of descriptions 500 and/or 550 in response to receiving a message (e.g., created by a user or automatically generated by a content provider) about an object. In some embodiments, control circuitry 417 generates for display description 500 by highlighting keywords (e.g., 510, 520, 530, 540) in the received message and displaying the highlighted keywords as part of the visual representation of the description.

In some embodiments, control circuitry 417 generates for display description 550 by processing a message about the object, extracting the keywords in the message, and only generating the keywords (e.g., 560, 570, 580, 590) for display in the visual representation of the description, as opposed to the entire message from which the keywords were extracted.

In some other embodiments, control circuitry 417 may receive one or more keywords from a user or from a content provider, without receiving a narrative description of the object itself (e.g., as shown in description 500). For example, these one or more keywords may be annotation tags created by a user (e.g., creator of the object or another user who has viewed/consumed the object) or a content provider. In another example, these one or more keywords may be automatically generated by control circuitry 417 based on metadata for the object as received from a content provider. In such embodiments, control circuitry 417 may generate for display some or all of the keywords that are received as part of the visual representation of the object description, as shown in description 550.

Description 500 may include one or more sentences textually describing the content of the object. For example, as shown in description 500, the descriptive sentence may be "President Bush addresses the nation about the 9/11 attacks on the World Trade Center". Control circuitry 417 of remote server 415 may retrieve descriptions 500 or 550 from information source 430, media content source 416, or media guidance data source 418. Once the description is retrieved, control circuitry 417 may instruct a text processing engine 630 (discussed further in relation to FIG. 6) to process the text in the description 500 or 550. Once the description 500 or 550 is textually processed by text processing engine 630, control circuitry 417 may identify one or more keywords in the description. For example, based on the results from the text processing engine, control circuitry 417 may identify the keywords in description 500 or 550 to be keyword 510 or 570 ("President"), keyword 520 or 560 ("Bush"), keyword 530 or 580 ("9/11"), and keyword 590 or 540 ("World Trade Center").

Some of these identified keywords may be primary keywords, and some may be secondary keywords. For example, control circuitry 417 may identify keywords 520 or 560 ("Bush") as a primary keyword by cross-referencing the keywords in description 500 or 550 with a database (e.g., 660, discussed in relation to FIG. 6) of primary keywords. Primary keywords may be words that correspond with category/classifier names. Thus, control circuitry 417 may identify keyword 520 or 560 ("Bush") as a primary keyword in response to determining that keyword 520 or 560 matches a category name stored in a category/classifier database 660. Once control circuitry 417 identifies one or more primary keywords from description 500 or 550, control circuitry 417 may designate one of the primary keywords as a target name.

Additionally, control circuitry 417 may identify one or more secondary keywords from description 500 or 550. The secondary keywords may be the rest of the identified keywords that do not include the primary keywords. For example, control circuitry 417 may identify the following keywords as secondary keywords: keyword 510 or 570

("President"), keyword 530 or 580 ("9/11"), and keyword 590 or 540 ("World Trade Center"). Primary keywords and secondary keywords may be processed by control circuitry 417 to compute likelihood scores associated with alternate names for the target name (e.g., "Bush"). Further details on the computation of likelihood scores for alternate names are discussed in relation to FIGS. 7 and 8.

Figure 6:
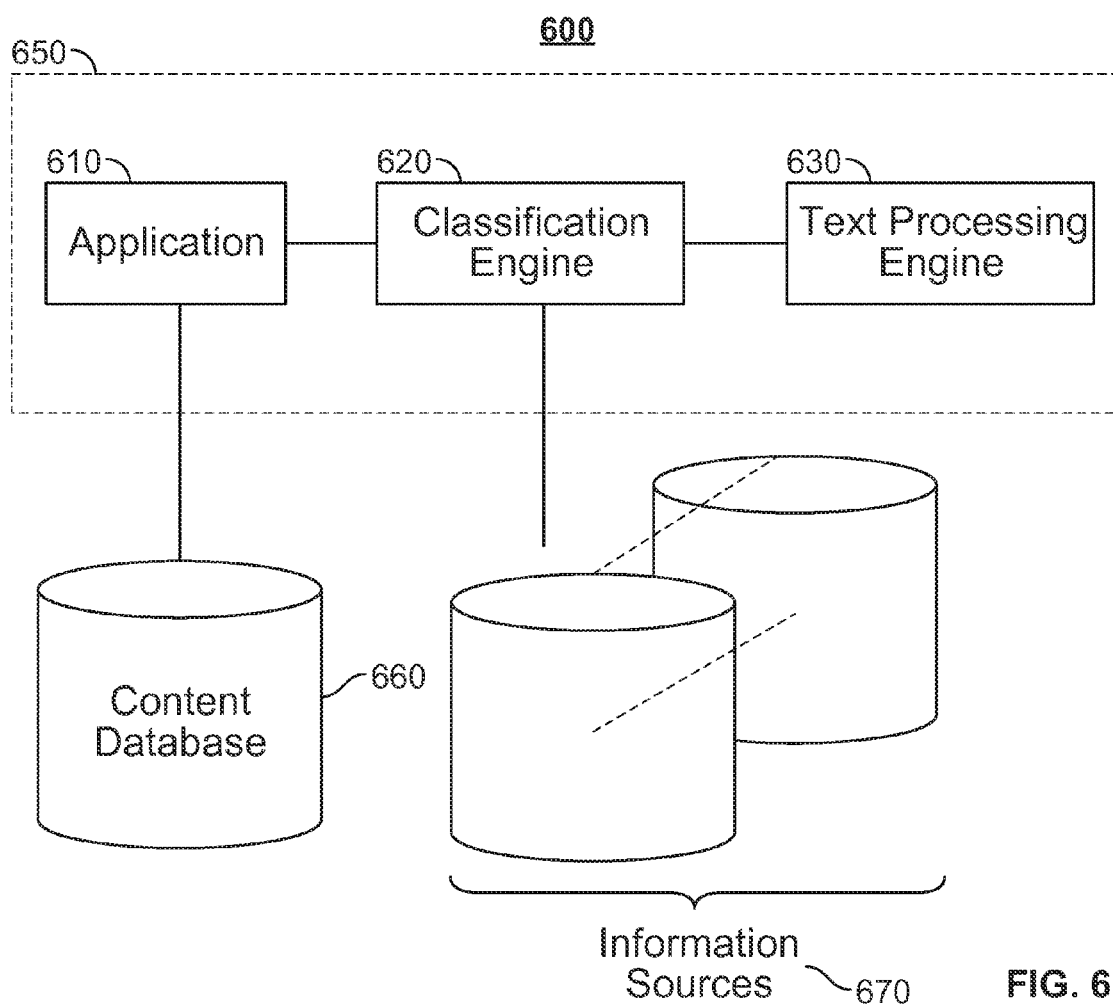
FIG. 6 is a high-level diagram of a system classifying an object associated with a target name in accordance with some embodiments of the disclosure.

FIG. 6 is a high-level diagram of a system 600 for classifying an object associated with a target name in accordance with some embodiments of the disclosure. The classification system 600 may comprise several components that are located on a remote server 650. Remote server 650 may be remote server 415, as shown in FIG. 4, with control circuitry 417. In some embodiments, remote server 650 may host several components to classify an object associated with a target name, such as application 610, a classification engine 620, and text processing engine 630. Control circuitry 417 of remote server 650 may execute software to run application 610. As referred to herein, operations performed by application 610, classification engine, or text processing engine should be understood to mean operations that are executed by control circuitry 417. For example, application 610 may be installed on remote server 650/415 as a piece of software code. Control circuitry 417 then executes the software corresponding to installed application 610 to perform operations for the application 610.

Application 610 may be a content management application that classifies content so that objects (associated with different content) may be more easily searched and organized. In some embodiments, application 610 may receive content from users using any of user equipment devices 402, 404, 408 and request the content to be stored in content database 650. Content database 650 may be media content source 46 or media guidance data source 422 or a separate content database that is not shown in FIG. 4. In some embodiments, application 610 may both retrieve and store content from and to content database 650. In either of these embodiments, the content database may be located on remote server 650, with application 610, or on a separate server that is remote to remote server 650.

Application 610 may retrieve one or more content objects from content database 660. In some embodiments, application 610 may be an application that manages media assets, where the retrieved content objects correspond to individual media assets (e.g., videos, songs, etc.). In one instance, application 610 may retrieve a media asset associated with a particular target name. For example, the media asset may be a video file object labeled as "bush.mpg".

In some embodiments, application 610 may be a document management application. For example, application 610 may store documents (e.g., articles, books, and other online or offline textual documents) in content database 660. In one instance, application 610 may retrieve a document object from content database 660. This document object may be a document labeled as "bush.doc" (offline text file) or "bush.html" (online document).

Application 610 may perform many operations related to content management, including organizing content by subject matter. To identify content objects with similar subject matter, application 610 may communicate with classification engine 620.

Classification engine 620 is responsible for classifying objects stored in content database based on similarity of subject matter. For example, if application 610 is a video management application, classification engine 620 classifies different videos by categorizing videos with the same or similar content/title/subject matter under the same category.

In another example, if application 610 is a document management application, classification engine 620 classifies different documents by categorizing documents with the same content/title/subject matter under the same category. Classification engine may reside as a software module on remote server 650 or on a separate server (not shown) that is remote to remote server 650.

To classify content stored on content database 660, classification engine 620 may communicate with information sources 670. Information sources 670 may be the same as information source 430, which is located remotely from remote server 650. Classification engine 620 may communicate with information sources 670, located remotely from remote server 415, over communications network 414. Information sources 670 store information about different types of content. In some embodiments, information sources 670 store a corpus of documents on a wide variety of subject matter. For example, information sources 670 may store information for online or offline encyclopedias, such as wiki pages for different types of subject matter. In some embodiments, information sources 670 may store a corpus of information about media assets or a collection of media assets themselves. Regardless of what form the information is stored in (e.g., documents, media assets, etc.), information sources 670 serve to provide supplemental information about a wide variety of subject matter in order enhance the classification process performed by classification engine 620. For example, this supplemental information may include a list of candidate alternative names (e.g., disambiguation terms) that are associated with a particular subject matter or target name. Additionally, this supplemental information may also include documents or media assets that are associated with the alternate names.

Classification engine 620 may also communicate with text processing engine 630 to identify keywords that are associated with a particular object stored in content database 660. Text processing engine 630 may be located on remote server 650 or on a separate server (not shown) that is remote from remote server 650. In some embodiments, content database may store descriptions about a particular content object, such as those illustrated in description 500 and 550 in FIG. 5. Application 610 retrieves the content object along with the associated description from content database 660 and instructs classification engine 620 to classify the object based on the associated description. Classification engine 620 instructs text processing engine 630 to process the text in the associated description. Text processing engine 630 extracts keywords (e.g., keywords 510/570, 520/560, 530/580, 540/590 in descriptions 500 and 550 in FIG. 5) from the associated description (e.g., 500 or 550) and returns these keywords to classification engine 620. To identify keywords, text processing engine 630 may communicate with a database (e.g., content database 660, information sources 670, or another keyword database not shown) which stores words that commonly refer to subject matter.

The keywords may be split up into different keyword types, such as primary and secondary keywords. This division of keywords based on type may be performed by text processing engine 630 or classification engine 620. In some embodiments, text processing engine 630 or classification engine 620 may designate a keyword as a primary keyword by cross-referencing that keyword with a list of categories. This list of categories may be stored in content database 600. For example, any keywords that correspond to a category name stored in a list of categories in content database 600 may be designated as a primary keyword. Any keywords that do not correspond to such a category name may be designated as a secondary keyword.

To classify a content object stored in content database 660, classification engine 620 first identifies a target name associated with the content object. For example, the target name may be the primary keyword in the description associated with the content object. Classification engine 620 may then retrieve a list of candidate alternative names for the target name. This list of candidate alternative names may be retrieved from information sources 670. Alternatively, this list of candidate alternative names may be stored in content database 660. Regardless of where the list is stored, each of the names in the list of candidate alternative names may correspond to content classifiers or categories of content. Classification engine 620 may perform an optional preliminary filtering step to remove any noise from the retrieved list of candidate alternative names. For example, this filtering step may involve determining whether any of the retrieved candidate alternative names are included in an information source associated with the target name ("target information source"). If a candidate alternative name is not included in the target information source, the candidate name is removed from the list of candidate alternative names. For example, this target information source may be the description associated with the content object (e.g., see descriptions 500 or 550) or a separate document retrieved from information sources 670 associated with the target name. For example, if the target name was "bush", the target information source may be a document entitled "Bush". Further details about this filtering process are discussed in relation to FIG. 7.

Classification engine 620 then performs a process that determines which of the list of candidate alternative names is a strong alternative name for the target name that is associated with the content object that is to be classified. Classification engine 620 makes this determination by computing likelihood scores for each of the candidate names in the list of candidate alternative names. Further details about this computation are discussed in relation to FIGS. 7 and 8. Based on these computed likelihood scores, classification engine 620 assigns one or more candidate names as likely alternative names for the target name and classifies the object associated with the target name (e.g., "bush.mpg") under the assigned alternative name(s). For example, if the target name associated with the object (e.g., video file labeled "bush.mpg") is "bush", and classification engine 620 selects the most likely alternative name as "George W. Bush", classification engine 620 will classify the object under the "George W. Bush" category.

Once classification engine 620 determines the proper category or categories for which to classify the content object, classification engine 620 updates the application 610 with the newly classified content. For example, if application 610 is a video management application, application 610 will store the "bush.mpg" video under the category of "George W. Bush", along with other videos with content about "George W. Bush". Similarly, if application 610 is a document management application, application 610 will store the document "bush.html" under the "George W. Bush" category, along with other documents about "George W. Bush". Once classified, these objects may be easily searched by users. For example, a user may find the video "bush.mpg" or the document "bush.html" by searching for "George W. Bush" or selecting a category option in a user interface that navigates the user to a list of content falling under the category of "George W. Bush".

Figure 7:
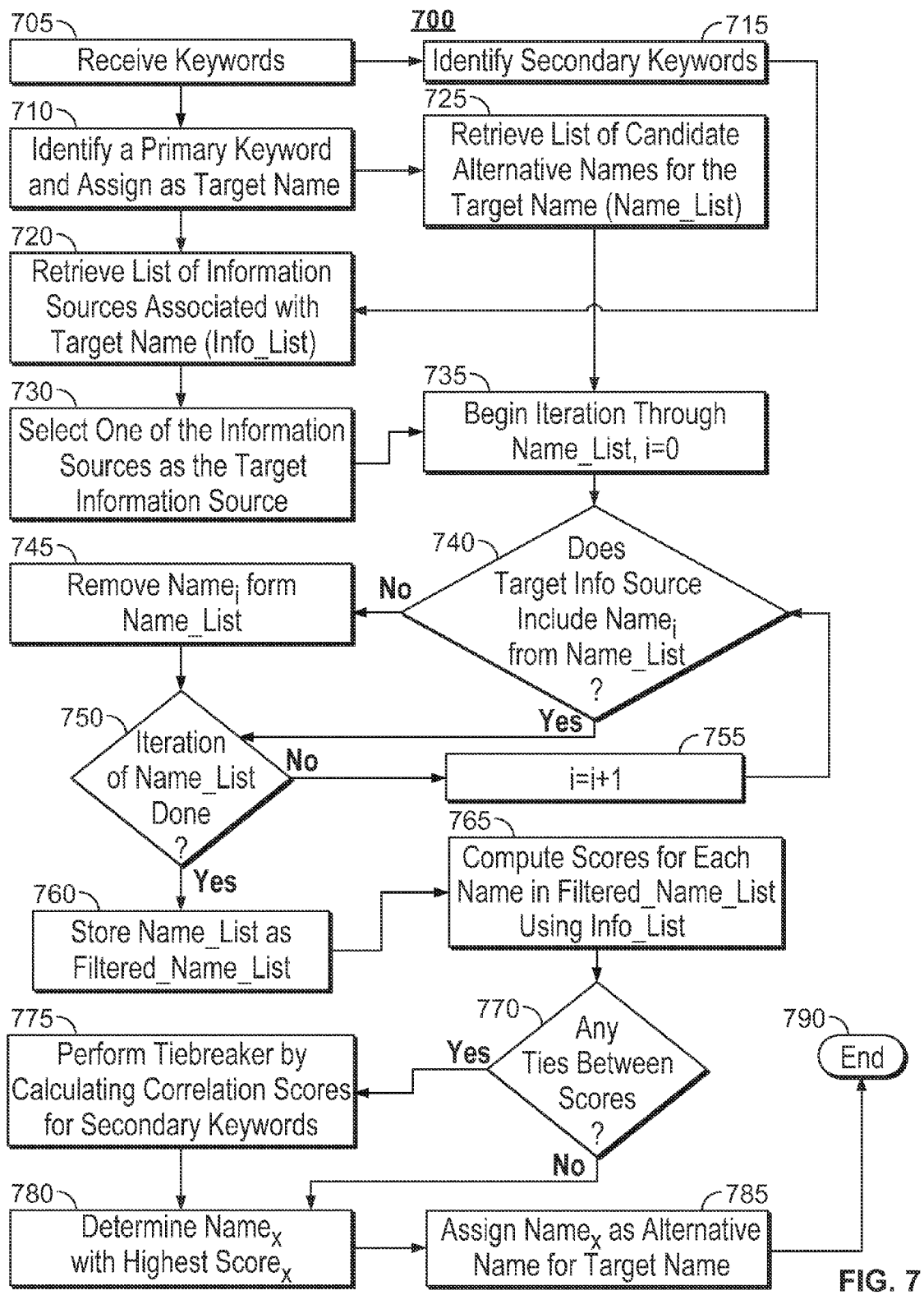
FIG. 7 is an illustrative flow chart for determining an alternative name for a target name in accordance with some embodiments of the disclosure.

FIG. 7 is an illustrative flow chart for a process 700 of determining an alternative name for a target name in accordance with some embodiments of the disclosure. At step 705, control circuitry 417 of remote server 415 receives keywords associated with an object. For example, these keywords may have been identified from a description (e.g., 500 or 550) associated with a content object (e.g., video labeled "bush.mpg") by text processing engine 630 and passed to classification engine 620, as discussed in relation to FIG. 6.

At step 710, control circuitry 417 identifies a primary keyword and assigns the primary keyword as the target name. Control circuitry 417 may identify a primary keyword by cross-referring the keywords received at step 705 with a primary keyword database (e.g., content database 660, information sources 670, or a separate database not shown in the figures). In some embodiments, primary keyword database may store keywords associated with categories that are used to classify content of a wide variety of subject matter. As discussed in relation to FIG. 6, the identification of a primary keyword may be performed by text processing engine 630 or classification engine 620. For example, based on description 500 or 550, control circuitry 417 may identify the primary keyword to be "bush" and assign "bush" as the target name.

At step 715, control circuitry 417 identifies secondary keywords. For example, based on description 500 or 550, control circuitry 417 may identify secondary keywords to be "President" (510 or 570), "9/11" (530 or 580), and "World Trade Center" (540 or 590). In some embodiments, step 715 may be an optional step in process 700. In some embodiments, control circuitry 417 may perform steps 715 and 710 concurrently. In other embodiments, control circuitry 417 may perform step 715 after step 710, where control circuitry 417 identifies secondary keywords as all the received keywords that were not identified as a primary keyword at step 710.

At step 725, control circuitry retrieves a list of candidate alternative names for the target name that was identified at step 710. This list of candidate alternative names is referred to in FIGS. 7 and 8 as "name_list". This list of candidate alternative names may be retrieved from information sources 670 or 600. In some embodiments, this list of candidate alternative names may be a list of disambiguation terms for the target name. For example, the list of candidate alternative names from the target name "bush" may include, but is not limited to, "George W. Bush", "George H. W. Bush", "Jeb Bush", "Bush, Illinois (location)", "bush (plant)", and "Bush (beer product)". In some embodiments, control circuitry 417 performs step 725 concurrently with steps 720 and/or 730. In some embodiments, control circuitry 417 performs step 725 before or after step 720.

Once the primary keyword ("target name") has been identified at step 710 (and optionally the secondary keywords have been identified at step 715), control circuitry 417 retrieves a list of information sources (referred to herein as "info_list") associated with the target name (e.g., "bush"). This list of information sources may be retrieved from information sources 670 or content database 660. This list of information sources may include any documents, media assets, or other types of information sources (as discussed in prior sections of this application) that are associated with the target name (e.g., "bush"). For example, each of the information sources may include the target name in the title, description, metadata, or any part of text associated with the information source. In some embodiments, step 715, step 725, and all subsequent steps may be performed by classification engine 620 as part of the classification process described in relation to FIG. 5.

At step 730, control circuitry 417 selects one of the information sources from the list as the target information source. For example, control circuitry 417 may select a description (e.g., 500 or 550) associated with a video object as the target information source. In another example, control circuitry 417 may select the target information source from the list as the most representative information source of the target name (e.g., "bush").

At step 735, control circuitry 417 begins a filtering process for each candidate name in name_list, as retrieved at step 725. In some embodiments, the filtering process, comprising steps 735, 740, 745, 750, and 755, is optional. Names in name_list are indexed by the variable counter "i". At step 735, the index "i" is set to 0.

As part of the filtering process, control circuitry 417 determines at step 740 if the target information source includes $name_i$ (or a very similar variant thereof), from name_list. For example, control circuitry 417 determines whether the description 500 or 550 includes a first candidate name (e.g., "George W. Bush"). In response to determining that the target information source does include $name_i$ (or a very similar variant thereof), control circuitry 417 does not filter out $name_i$ from name_list and proceeds to step 750. Otherwise, in response to determining that the target information source does not include $name_i$ (or a very similar variant thereof), control circuitry 417 filters $name_i$ from name_list by removing $name_i$ from name_list at step 745 and proceeding to step 750. For example, if $name_i$ is "George W. Bush", control circuitry 417 would not filter the name from name_list since the description (500 or 550) does include the name "George W. Bush". Similarly, control circuitry 417 would not filter the name "George H. W. Bush", because "George H. W. Bush" is very similar in spelling to "George W. Bush", which is included in the description. In another example, if $name_i$ is "Bush, Illinois (location)", control circuitry 417 would filter the name from name_list because the description does not include the name "Bush, Illinois (location)".

At step 750, control circuitry 417 determines whether iteration of name_list is complete (i.e., whether all the names in name_list have undergone step 740 and/or 745). In response to determining that the iteration is not yet completed, control circuitry 417 proceeds to step 755. At step 417, control circuitry increments the index counter "i". Control circuitry 417 then proceeds back to step 755 and examines the next candidate name in name_list as $name_i$. Otherwise, in response to determining that the iteration of name_list is complete, control circuitry 417 proceeds to step 760.

At step 760, control circuitry 417 stores name_list as "filtered_name_list". The filtered_name_list may be stored on remote server 415 or on another server that is remote to remote server 415. In some embodiments, filtered_name_list may be the same name_list that was retrieved at step 725 if the optional filtering process (steps 735-755) was not performed. In the embodiments where the filtering process was performed, filtered_name_list may still be the same as the initial name_list that was retrieved at 725 if no candidate names were removed during the filtering process at steps 735-755. However, if candidate names were removed during the filtering process, filtered_name_list may have less candidate names than the original name_list retrieved at step 725. For example, control circuitry 417 may have removed the candidate names "Bush, Illinois (location)" and "Jeb Bush" as part of the filtering process (steps 735-755) from the list of candidate names retrieved at step 725. Thus, the resulting filtered_name_list may only contain the remaining candidate names: "George W. Bush", "George H. W. Bush", "bush (plant)", and "Bush (beer product)".

At step 760, control circuitry 417 may compute scores for each name in filtered_name_list using info_list (retrieved at step 720). Further details about how these scores are computed for each candidate name in filtered_name_list is discussed in relation to FIG. 8.

At step 770, control circuitry 417 determines whether there are any ties between scores that were computed at step 765. In response to determining that one or more ties exist, control circuitry 417 proceeds to step 775 to perform a tiebreaker by calculating correlation scores for secondary keywords (as retrieved at step 715). For example, control circuitry 417 may determine that two names "George W. Bush" and "George H. W. Bush" have the same score at step 770 and proceeds to step 775 to before further tiebreaker calculations based on correlation values between these two candidate names and each of the secondary keywords identified at step 715. The computation of correlation scores is similar to process 800 illustrated in FIG. 8. Further details about how correlation scores are computed will be discussed in relation to FIG. 8. After performing the tiebreaker process at step 775, control circuitry 417 proceeds to step 780. In response to determining that no ties exist between scores at step 770, control circuitry 417 proceeds to step 780.

At step 785, control circuitry 417 determines which candidate $name_x$ from filtered_name_list has the highest score x. If a tiebreaker process was performed at step 775 to break ties detected at step 770, the scores would have been updated to account for correlation values between each of the candidate names and each of the secondary keywords. For example, control circuitry 417 may determine that the first candidate name "George W. Bush" has the highest score after performing the tiebreaker calculations at step 775 because the calculations yielded a higher correlation score for "George W. Bush" than second candidate name "George H. W. Bush". Although first candidate name "George W. Bush" and second candidate name "George H. W. Bush" may have the same correlation value with secondary keyword "president" (since both names refer to former presidents), "George W. Bush" may still have a higher aggregate correlation score because "George W. Bush" has a higher correlation with the other secondary keywords "9/11" and "World Trade Center" (events associated with the presidency of George W. Bush and not George H. W. Bush) than second candidate name "George H. W. Bush". The name with the highest score represents the candidate name with the highest likelihood of being the alternative name for the target name (e.g., "bush").

At step 785, control circuitry 417 assigns $name_x$, as determined at step 780, as an alternative name for target name. For example, control circuitry 417 assigns "George W. Bush", which had the highest score of all other candidate names from name_list, as a likely alternative name for the target name "bush". Control circuitry 417 then ends process 700 at step 790.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, and/or components discussed in relation to FIGS. 3, 4, and 6 could be used to perform one or more of the steps in FIG. 7.

Figure 8:
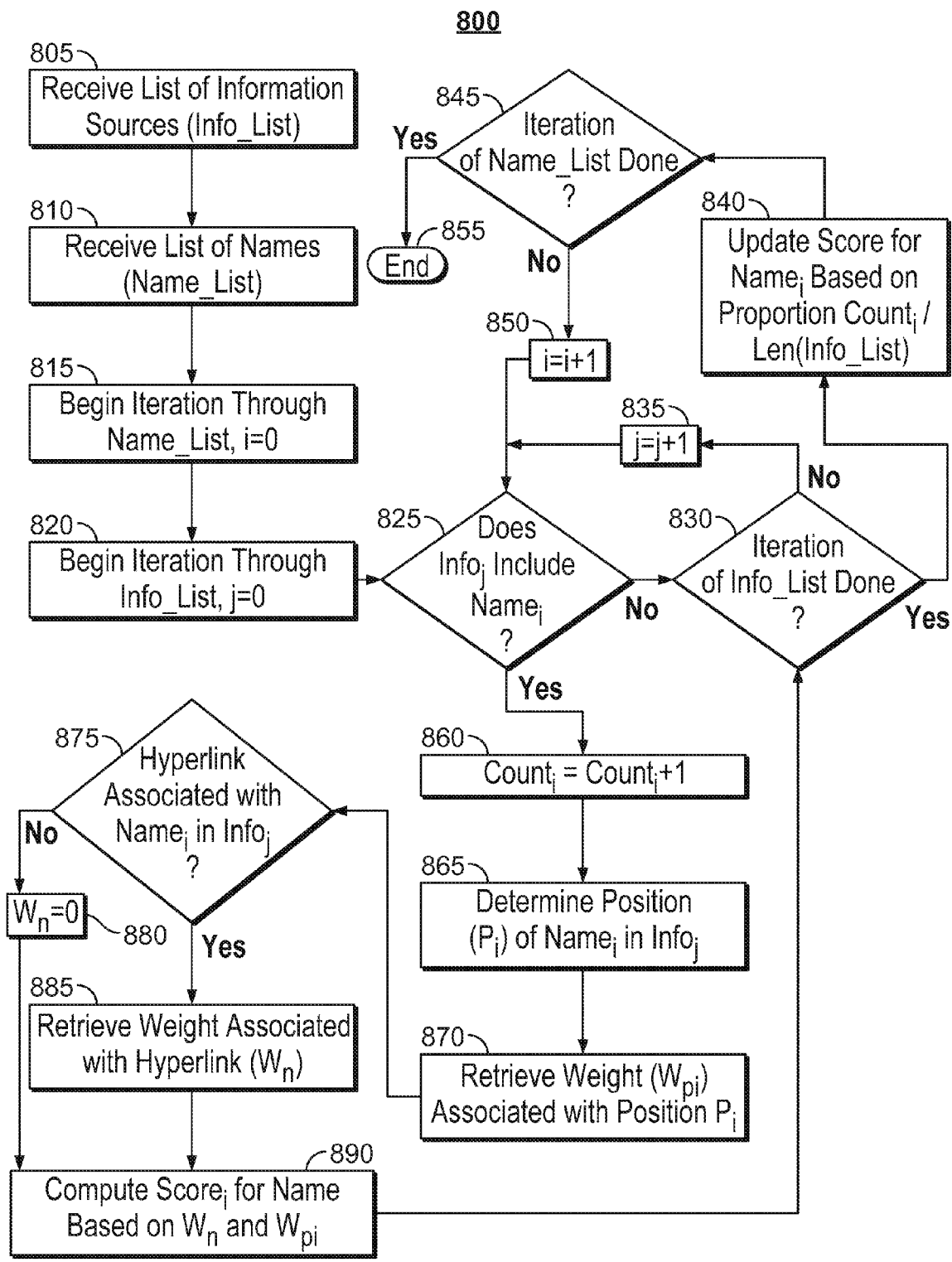
FIG. 8 is an illustrative flow chart for computing the strength of candidate alternative names for a target name in accordance with some embodiments of the disclosure.

FIG. 8 is an illustrative flow chart for a process 800 of computing the strength of candidate alternative names for a target name in accordance with some embodiments of the disclosure. As mentioned in relation to FIG. 7, process 800 may be used to compute scores for candidate names as part of step 765 (i.e., initial computation of scores) and/or step 775 (as part of a tiebreaking process if the scores computed at step 765 result in any ties). In some embodiments, process 800 may be entirely performed by classification engine 620, as discussed in relation to FIG. 6.

At step 805, control circuitry 417 receives a list of information sources ("info_list"). In embodiments, process 800 corresponds to the initial computation of scores at step 765. These embodiments are referred to herein as the "first embodiments". In accordance with the first embodiments, control circuitry 417 may retrieve this list of information sources as the list of information sources associated with the target name, as discussed in relation to step 720 of process 700.

In some embodiments, process 800 corresponds to the tiebreaker process, as discussed in relation to step 775 of process 700. These embodiments are referred to herein as the "second embodiments". In accordance with the second embodiments, control circuitry 417 retrieve this "info_list" as a list of information sources associated with candidate names that are tied, as detected at step 770. For example, control circuitry 417 may determine at step 770 that first candidate name "George W. Bush" and second candidate name "George H. W. Bush" have the same computed score. In response to determining that these two scores are tied, control circuitry 417 retrieves a list of information sources associated with each of the tied candidates. Like the information sources associated with the target name, these information sources associated with the tied candidate names may also be stored at information sources 670 and/or content database 660. These information sources may be similar or different from the types of information sources associated with the target name (e.g., documents, media assets, articles, books, or any or online or offline information sources).

At step 810, control circuitry 417 receives a list of names ("name_list"). In accordance with the first embodiments, control circuitry 417 may retrieve this name_list as the name_list retrieved at step 725 or as the "filtered_name_list" stored at step 760 in process 700. In accordance with the second embodiments, control circuitry 417 may retrieve the identified secondary keywords as the "name_list" at step 810. These secondary keywords were identified by control circuitry at step 715 of process 700. For example, these secondary keywords may include, but are not limited to, "President", "9/11", and "World Trade Center". Step 810 may be performed concurrently with step 805 or in any order.

At step 815, control circuitry 417 begins an iteration through each candidate name in name_list. As with step 735, each name in name_list is indexed by an index counter variable "i". When the iteration of name_list begins at step 815 for the first time, control circuitry 417 sets index "i" to 0.

At step 820, control circuitry 417 begins an iteration through info_list. Each information source in info_list is indexed by an index counter variable "j". When the iteration of info_list begins at step 820, index "j" is set to 0.

At step 825, control circuitry 417 determines whether info includes $name_i$. In accordance with the first embodiments, control circuitry 417 determines whether a first information source associated with the target name (e.g., a document associated with the name "bush") includes name, (e.g., "George W. Bush). In accordance with the second embodiments, control circuitry 417 determines whether a first information source associated with a first candidate name (e.g., a document about "George W. Bush") includes name, (keyword "World Trade Center") from "name_list" (list of secondary keywords). For example, in accordance with the second embodiments, control circuitry 417 may determine whether a document about "George W. Bush" includes the keyword "President".

In response to determining that info does not include $name_i$, control circuitry 417 proceeds to step 830. At step 830, control circuitry 417 determines whether the iteration of info_list is complete. In response to determining that the iteration of info_list is complete, control circuitry 417 proceeds to step 835. At step 835, control circuitry 417 increments the index counter "j" for info_list and then proceeds back to step 825. Control circuitry 417 then performs step 825 again for the next information source in info_list. In response to determining that the interaction of info_list is complete at step 830, control circuitry 417 proceeds to step 840.

If control circuitry 417 determines that $info_j$ does include $name_i$ at step 825, control circuitry 417 proceeds to step 860. At step 860, control circuitry 417 increments a count variable ($count_i$), which is associated uniquely with $name_i$. For example, in accordance with the first embodiments, $count_i$ keeps track of the number of information sources associated with the target name (e.g., the number of documents associated with "bush") that includes a given candidate name, (e.g., "George W. Bush"). In accordance with the second embodiments, $count_i$ keeps tracks of the number of information sources associated with a candidate name (e.g., documents about "George W. Bush") that includes a keyword (e.g., "World Trade Center").

At step 865, control circuitry 417 determines a position ($p_i$) of $name_i$ in $info_j$. At step 870, control circuitry 417 retrieves a weight ($w_{pi}$) associated with position $p_i$. In some embodiments, positions that correspond to higher sections in a document (e.g., header, title, first paragraph, summary, author section, etc.) are assigned higher weights than position corresponding to lower portions of a document (e.g., footnote, bibliography, conclusion). The purpose of assigning higher weights to higher positions than lower position is to reflect the importance/relevance of a particular word/ name in a document. For example, if a word is included in a title position of a document, then it is more likely that the subject matter contained in that document is about that particular word.

For example, in accordance with the first embodiments, control circuitry 417 may determine that the first candidate name "George W. Bush" is located at the title position of a document about "bush", thus indicating that the subject matter of the document is more likely to be about "George W. Bush". In contrast, if the first candidate name "George W. Bush" was in the footnote section of the document, it would be less likely that the subject matter of the document is about "George W. Bush".

The same rationale for assigning different weights to different positions applies to the second embodiments. For example, control circuitry 417 may determine at step 865 that the keyword "World Trade Center" is located in the body section of a document about "George W. Bush". Control circuitry 417 then retrieves the weight associated with the body section position. In some embodiments, the weight associated with the body section position will be lower than the weight associated with the title position but higher than the weight associated with the footnote or bibliography section.

Once control circuitry 417 retrieves the weight associated with position $p_i$ at step 870, control circuitry proceeds to step 875. At step 875, control circuitry 417 determines whether a hyperlink is associated with $name_i$ in $info_j$. For example, in accordance with the first embodiments, control circuitry 417 may determine whether the first candidate name "George W. Bush" is hyperlinked in the document associated with "bush". In accordance with the second embodiments, control circuitry 417 may, as another example, determine whether the keyword "World Trade Center" is hyperlinked in the document about candidate name "George W. Bush".

In response to determining that $name_i$ is hyperlinked in $info_j$ at step 875, control circuitry 417 proceeds to step 885 to retrieve another weight associated with the existence of the hyperlink ($w_h$) at step 885. Control circuitry 417 then proceeds to step 890. In response to determining that $name_i$ is not hyperlinked in info at step 875, control circuitry 417 proceeds to step 880, where it assigns the weight $w_h=0$. Control circuitry 417 then proceeds to step 890.

At step 890, control circuitry 417 computes $score_i$ for $name_i$ based on the two weights $w_{pi}$ and $w_h$ determined at steps 870 and 880 or 885. In some embodiments, control circuitry 417 computes $score_i$ as a linear combination of the two weights $w_{pi}$ and $w_h$. In other embodiments, control circuitry 417 computes $score_i$ as another type of function (e.g., polynomial, exponential, logarithmic or combination thereof) of weights $w_{pi}$ and $w_h$. In some embodiments, the weight assigned to the existence of a hyperlink is higher than the highest weight assigned to a position. In other embodiments, the opposite is true. In general, a name, that is associated with a higher position weight $w_{pi}$ and hyperlink weight $w_h$ will have a higher score, than another $name_b$ that is associated with a lower position weight and hyperlink weight.

Once control circuitry 417 computes the $score_i$ for $name_i$ at step 890, control circuitry 417 proceeds to step 830 to determine whether all information sources in info_list have been iterated through. The steps that occur if control circuitry 417 determines that the iteration of info_list is not complete were previously discussed.

In response to determining that the iteration of info_list is complete at step 830, control circuitry 417 proceeds to step 840. At step 840, control circuitry 417 updates the $score_i$ for $name_i$ based on the $count_i$ that was computed at step 860 for each information source in info_list. Control circuitry 417 may calculate the proportion of information sources that referred to $name_i$ by computing the ratio of $count_i$/length of info_list. The length of info_list is the total number of information sources in the info_list. For example, in accordance with the first embodiments, control circuitry 417 may determine that ⅓ of all the information sources associated with the target name "bush" referred to candidate name "George W. Bush". In accordance with the second embodiments, control circuitry 417 may determine that 1/5 of the information sources associated with candidate name "George W. Bush" referred to the keyword "World Trade Center".

At step 845, control circuitry 417 may determine whether the iteration of name_list is complete (i.e., whether all the names in name_list have been [through]). In response to determining that the iteration of name_list is not complete, control circuitry 417 proceeds to step 850. At step 850, control circuitry 417 increments the index "i" for name_list and proceeds to step 825. At step 825, control circuitry 417 begins a new iteration process through all the information sources in info_list, but for the next name ($name_{i+1}$) in name_list. In response to determining that the iteration of name_list is complete, control circuitry 417 ends process 800 at step 855.

At the end of process 800, control circuitry 417 will have computed scores for each name in name_list. For example, in accordance with the first embodiments, control circuitry 417 may compute the first score for the first candidate name "George W. Bush" to be markedly higher than any other of the other candidate names in the list of candidate alternative names. In another example, control circuitry 417 may compute the first score for the first candidate name "George W. Bush" to be the same or very close to the second score for second candidate name "George H. W. Bush". In this case, control circuitry 417 may proceed to perform a tiebreaker process, as discussed in relation to step 775 in process 700. This tiebreaker process corresponds to the second embodiments of process 800.

In accordance with the second embodiments, control circuitry 417 may compute, as an example, the first correlation score for the first candidate "George W. Bush" to be higher than the second correlation score for the second candidate "George H. W. Bush" due to stronger computed correlation values with keywords "World Trade Center" and "9/11". Based on the difference between the first correlation score and second correlation score, control circuitry 417 may break the tie between the first and second candidate names and proceed to step 780 and onwards of process 700 to ultimately assign the first candidate name as an alternative name for the target name "bush".

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, and/or components discussed in relation to FIGS. 3, 4, and 6 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining alternative names, the method comprising:
   retrieving, based on input from a user, a plurality of candidate alternative names for a target name;
   storing the plurality of candidate alternative names;
   identifying a plurality of media assets associated with the target name, wherein each of the plurality of media assets is provided by a source other than the user;

generating a first classification group that includes each of the plurality of media assets that refers to a first candidate name;
generating a second classification group that includes each of the plurality of media assets that refers to a second candidate name;
computing a first value representing a first number of media assets in the first classification group;
computing a second value representing a second number of media assets in the second classification group;
in response to determining that the first value exceeds the second value, assigning the first candidate name, instead of the second candidate name, as an alternative name for the target name; and
in response to determining that the second value exceeds the first value, assigning the second candidate name, instead of the first candidate name, as the alternative name for the target name.

2. The method of claim 1, wherein:
the first value is a first proportion of the identified plurality of media assets that refers to the first candidate name, and
the second value is a second proportion of the identified plurality of media assets that refers to the second candidate name.

3. The method of claim 1, wherein:
the first value is computed based on a first metadata associated with the first candidate name, and
the second value is computed based on a second metadata associated with the second candidate name, wherein
the first metadata and the second metadata are each retrieved from at least one of the plurality of media assets.

4. The method of claim 3, wherein the first metadata indicates at least one of:
a position of the first candidate name in a media asset of the plurality of media assets, and
a hyperlink associated with the first candidate name in a media asset of the plurality of media assets, wherein the hyperlink is associated with a higher weight than the position in computing the first value.

5. The method of claim 1, wherein each of the plurality of media assets is one of:
a webpage associated with the target name,
an article associated with the target name,
a book associated with the target name, and
a media asset associated with the target name.

6. The method of claim 1, further comprising:
retrieving, using the control circuitry, a list of disambiguation documents associated with the target name, wherein the plurality of candidate alternative names is extracted from the retrieved list of disambiguation documents.

7. The method of claim 1, wherein the target name is associated with a media asset, and wherein each of the plurality of candidate alternative names represents a different candidate category for the media asset.

8. The method of claim 1, wherein the target name is associated with a target information source, further comprising:
filtering, using the control circuitry, the plurality of candidate alternative names, wherein the filtering comprises removing one of the plurality of candidate alternative names in response to determining that the target information source does not refer to the one of the plurality of candidate names.

9. The method of claim 1, wherein the target name is a primary keyword in a plurality of keywords associated with a media asset, further comprising:
identifying a secondary keyword from the plurality of keywords;
computing, using the control circuitry, the first value based on a first correlation value between the first candidate name and the secondary keyword; and
computing, using the control circuitry, the second value based on a second correlation value between the second candidate name and the secondary keyword.

10. The method of claim 1, further comprising:
computing a first correlation value based on the number of times a secondary keyword appears in a first media asset associated with the first candidate name; and
computing a second correlation value based on the number of times the secondary keyword appears in a second media asset associated with the second candidate name.

11. A system for determining alternative names, the system comprising:
storage circuitry configured to:
store a plurality of candidate alternative names for a target name, wherein the plurality of candidate alternative names;
control circuitry configured to:
retrieve, based on input from a user, the plurality of candidate names;
identify a plurality of media assets associated with the target name, wherein each of the plurality of media assets is provided by a source other than the user;
generate a first classification group that includes each of the plurality of media assets that refers to a first candidate name;
generate a second classification group that includes each of the plurality of media assets that refers to a second candidate name;
compute a first value representing a first number of media assets in the first classification group;
compute a second value representing a second number of media assets in the second classification group;
assign the first candidate name, instead of the second candidate name, as an alternative name for the target name responsive to a determination that the first value exceeds the second value; and
assign the second candidate name, instead of the first candidate name, as the alternative name for the target name responsive to a determination that the second value exceeds the first value.

12. The system of claim 11, wherein:
the first value is a first proportion of the identified plurality of media assets that refers to the first candidate name, and
the second value is a second proportion of the identified plurality of media assets that refers to the second candidate name.

13. The system of claim 11, wherein:
the first value is computed based on a first metadata associated with the first candidate name, and
the second value is computed based on a second metadata associated with the second candidate name, wherein
the first metadata and the second metadata are each retrieved from at least one of the plurality of media assets.

14. The system of claim 13, wherein the first metadata indicates at least one of:
a position of the first candidate name in a media asset of the plurality of media assets, and a hyperlink associated with the first candidate name in a media asset of the plurality of media assets, wherein the hyperlink is associated with a higher weight than the position in computing the first value.

15. The system of claim 11, wherein each of the plurality of media assets is one of:
   a webpage associated with the target name,
   an article associated with the target name,
   a book associated with the target name, and
   a media asset associated with the target name.

16. The system of claim 11, wherein the control circuitry is further configured to:
   retrieve a list of disambiguation documents associated with the target name, wherein the plurality of candidate alternative names is extracted from the retrieved list of disambiguation documents.

17. The system of claim 11, wherein the target name is associated with a media asset, and wherein each of the plurality of candidate alternative names represents a different candidate category for the media asset.

18. The system of claim 11, wherein the target name is associated with a target information source, wherein the control circuitry is further configured to:
   filter the plurality of candidate alternative names, wherein the filtering comprises removing one of from the plurality of candidate alternative names in response to determining that the target information source does not refer to the one of the plurality of candidate names.

19. The system of claim 11, wherein the target name is a primary keyword in a plurality of keywords associated with a media asset, wherein the control circuitry is further configured to:
   identify a secondary keyword from the plurality of keywords;
   compute the first value based on a first correlation value between the first candidate name and the secondary keyword; and
   compute the second value based on a second correlation value between the second candidate name and the secondary keyword.

20. The system of claim 11, wherein the control circuitry is further configured to:
   compute a first correlation value based on the number of times a secondary keyword appears in a first media asset associated with the first candidate name; and
   compute a second correlation value based on the number of times the secondary keyword appears in a second media asset associated with the second candidate name.

* * * * *